United States Patent [19]

Ashikaga et al.

[11] Patent Number: 5,457,518
[45] Date of Patent: Oct. 10, 1995

[54] COLOR REGISTRATION ERROR DETECTING METHOD

[75] Inventors: Hideaki Ashikaga; Masao Ito, both of Kanagawa, Japan

[73] Assignee: Fuji Xerox Co., Ltd., Tokyo, Japan

[21] Appl. No.: 138,021

[22] Filed: Oct. 19, 1993

[30] Foreign Application Priority Data

Oct. 22, 1992 [JP] Japan ................................ 4-308028

[51] Int. Cl.$^6$ ........................... G03G 15/00; G03G 15/01
[52] U.S. Cl. ........................... 355/208; 355/327; 347/116
[58] Field of Search ............................... 355/271, 326 R, 355/327, 208; 358/526; 346/157; 101/181, 248; 364/469

[56] References Cited

U.S. PATENT DOCUMENTS 5,287,162  2/1994  de Jong et al. ................... 355/326 R

FOREIGN PATENT DOCUMENTS

1-183676  7/1989  Japan .

Primary Examiner—Joan H. Pendegrass
Attorney, Agent, or Firm—Finnegan, Henderson, Farabow, Garrett & Dunner

[57] ABSTRACT

A color registration error detecting method for repeatedly forming a plurality of registration error detection patterns of different colors on an image carrier, detecting the registration error detection patterns, and detecting a color registration error from detection signals of the patterns. In this method, a sampling length and a sampling frequency for detection of the registration error detection patterns are set so as to satisfy the conditions of (1) the sampling length is to be approximated to a wavelength of a vibrational component be read with a registration error component by registration error detecting means or to an integer multiple of the wavelength; (2) the sampling length is to be set as large as possible; and (3) the sampling frequency and an integer multiple thereof are to be separated as far as possible from a frequency of the vibrational component. Accordingly, the detection accuracy of the color registration error can be improved by sampling the original color registration error only from the color image registration error and the various vibrational components to be read by the pattern detecting means, thereby realizing both a high quality and a high speed in a color image forming device.

7 Claims, 10 Drawing Sheets

COLOR REGISTRATION ERROR DETECTING METHOD

BACKGROUND OF THE INVENTION

The present invention relates to a color registration error detecting method for detecting an error of a color image forming position (which will be hereinafter referred to as a color image registration) for use in a color image forming device for transferring multiple images of different colors onto a recording member or an intermediate transfer member to obtain a color image. More particularly, the invention relates to a color registration error detecting method for determining an interval and the number of times of computation of pattern positions as a basic for detecting color image registration error.

In recent years, colored documents have increasingly been processed in offices and the like, and accordingly image forming devices handling such color documents, such as copying machines, printers, facsimiles, etc., have also increasingly need to have the capacity to accommodate colored documents. Further, at present, a need exists for such color equipment to be improved in image quality and operation speed consistently with high quality and high speed business processes in offices or the like.

As color equipment capable of meeting this requirement, there has already been proposed a so-called tandem type color image forming device having a plurality of color image forming units for different colors of black (K), yellow (Y), magenta (M), and cyan (C) to transfer multiple images having the different colors formed by the image forming units onto a recording member of an intermediate transfer member thereby forming a color image.

Such a tandem type color image forming device is designed to form a color image by using a plurality of image forming units. Accordingly, the device operation speed is very high, but the images of the different colors are apt to slip, that is, an error of color registration is apt to occur, causing a significant defect which makes it difficult to obtain high quality for the color image. The registration defect is due to the fact that a change in internal temperature of the image forming device, or application of an external force to the image forming device, causes a fine change in position of each image forming unit or parts in each image forming unit. The change in internal temperature of the image forming device and the application of an external force to the image forming device are unavoidable. For example, a routine operation such as removal of jamming, parts replacement in maintenance, and movement of the image forming device causes the application of an external force to the image forming device.

To solve this problem, there has been proposed in Japanese Patent Laid-open Publication No. 1-183676 a color registration error detecting method for realizing high quality of a color image by correcting a color image registration. This method includes the steps of generating a predetermined registration error measurement pattern from each image forming unit, reading this pattern by using pattern detecting means, calculating a color registration error from a detection signal from the pattern detecting means, and correcting each image forming unit so as to eliminate the color registration error, thus realizing high quality for the color image.

However, this prior art method has the following problem. In reading the predetermined registration measurement patterns, the pattern detecting means also reads vibrational components in addition to the original color registration error be measured. The vibrational components include:

i) A vibrational component resulting from the registration error measurement patterns themselves, that is, a vibrational component due to the fact that the registration error measurement patterns are not strictly equally spaced from each other.

ii) A fluctuation in position or speed of a paper feed mechanism, a recording paper, or an intermediate transfer member.

iii) A vibration of the pattern detecting means itself.

Accordingly, a great loss occurs in the accuracy of detection of the color registration error, and it is therefore difficult to obtain a high-quality image in spite of the correction of each image forming unit. Further, the higher an image forming speed, the larger the above vibrational components, causing further loss of detection accuracy of the color registration error. Thus, high quality and high image speed forming cannot be realized simultaneously. Thus, the described vibrational components make it difficult to develop a high-quality, high-speed color image forming device.

SUMMARY OF THE INVENTION

It is accordingly an object of the present invention to provide a color registration error detecting method which can improve the detection accuracy of the color registration error by sampling the original color registration error and the various vibrational components to be read by the pattern detecting means, thereby realizing both high quality and high speed in a color image forming device.

According to the present invention, there is provided in a color registration error detecting method for repeatedly forming a plurality of registration error detection patterns of different colors on an image carrier, detecting said registration error detection patterns, and detecting a color registration error from detection signals of said patterns; the improvement wherein a sampling length and a sampling frequency for detection of said registration error detection patterns are set so as to satisfy the following conditions:

① said sampling length is to be approximated to a wavelength of a vibrational component to be read with a registration error component by registration error detecting means or to an integer multiple of said wavelength;

② said sampling length is to be set as large as possible; and

③ said sampling frequency and an integer multiple thereof are to be separated as far as possible from a frequency of said vibrational component.

A transfer feed belt is preferably used as the image carrier for retaining a recording paper. However, the image carrier is not limited in structure to transfer feed belt. For example, intermediate transfer members or drums for temporarily retaining images, such as a plurality of image forming units, may be used as each image forming unit.

A unit capable of forming an image by an electrophotographic method may be used as each image forming unit.

Alternatively, such an image forming unit may include a device capable of forming an image by transferring a pigment or the like on an ink ribbon by heat or impact force, a device capable of forming an image by splashing ink, etc.

In another aspect of the color registration error detecting method according to the present invention, an interval of repeated detection of said color registration error is detected from the following expression in relation to said vibrational component (fi(t) where t=time; i=1 to m) to be read with said registration error component by said registration error detecting means:

$$\text{Error} = [\Sigma\Sigma f_i(\text{int} \times j)]/n$$

where $\Sigma$ of the first occurrence takes i=1 to m; $\Sigma$ of the second occurrence takes j=1 to n; m represents the kind of said vibrational component; n represents the number of times of said repeated detection of said color registration error; and int represents said interval of said repeated detection of said color registration error.

In still another aspect of the color registration error detecting method according to the present invention, the number of times of repeated detection of said color registration error is detected from the following expression in relation to said vibrational component ($f_i(t)$ where t=time; i=1 to m) to be read with said registration error component by said registration error detecting means:

$$\text{Error} = [\Sigma\Sigma f_i(\text{int} \times j)]/n = [\Sigma \int f_i(t) dt]/L$$

where $\Sigma$ of the first occurrence takes i=1 to m; $\Sigma$ of the second occurrence takes j=1 to n; $\int$ takes 0 to 1; m represents the kind of said vibrational component; n represents the number of times of said repeated detection of said color registration error; int represents an interval of said repeated detection of said color registration error; and L=n×int.

In a further aspect of the color registration error detecting method according to the present invention, an interval of repeated detection of said color registration error and the number of times of said repeated detection of said color registration error are detected from the following expression in relation to said vibrational component ($f_i(t)$ where t=time; i=1 to m) to be read with said registration error component by said registration error detecting means:

$$\text{Error} = [\Sigma\Sigma f_i(\text{int} \times j)]/n = [\Sigma \int f_i(t) dt]/L$$

where $\Sigma$ of the first occurrence takes i=1 to m; $\Sigma$ of the second occurrence takes j=1 to n; $\int$ takes 0 to 1; m represents the kind of said vibrational component; n represents the number of times of said repeated detection of said color registration error; int represents said interval of said repeated detection of said color registration error; and L=n×int.

Furthermore, when a frequency Fs of said registration error component is less than a value twice a frequency Fac of said vibrational component to be read with said registration error component by said registration error detecting means, a moire signal (frequency=|Fac−Fs×k| where if Fs/2≦Fac≦3Fs/2, k=1; if 3Fs/2<Fac≦5Fs/2, k=2; and so forth) to be generated by both said registration error component and said vibrational component is used as $f_i(t)$ (t=time; i=1 to m) to obtain said error.

According to the present invention described above, the sampling length and the sampling frequency for detection of the registration error detection patterns are set so as to satisfy the following conditions:

(1) the sampling length is to be approximated to a wavelength of a vibrational component of the detection signal or to an integer multiple of the wavelength;

(2) the sampling length is to be set as large as possible; and (3) the sampling frequency and an integer multiple thereof are to be separated as far as possible from a frequency of the vibrational component of the detection signal. Accordingly, the detection accuracy of the color registration error can be improved.

Other objects and features of the invention will be more fully understood from the following detailed description and appended claims when taken with the accompanying drawings.

DETAILED DESCRIPTION OF THE PREFERRED EMBODIMENTS

There will now be described a preferred embodiment of the present invention with reference to the drawings.

Figure 2:
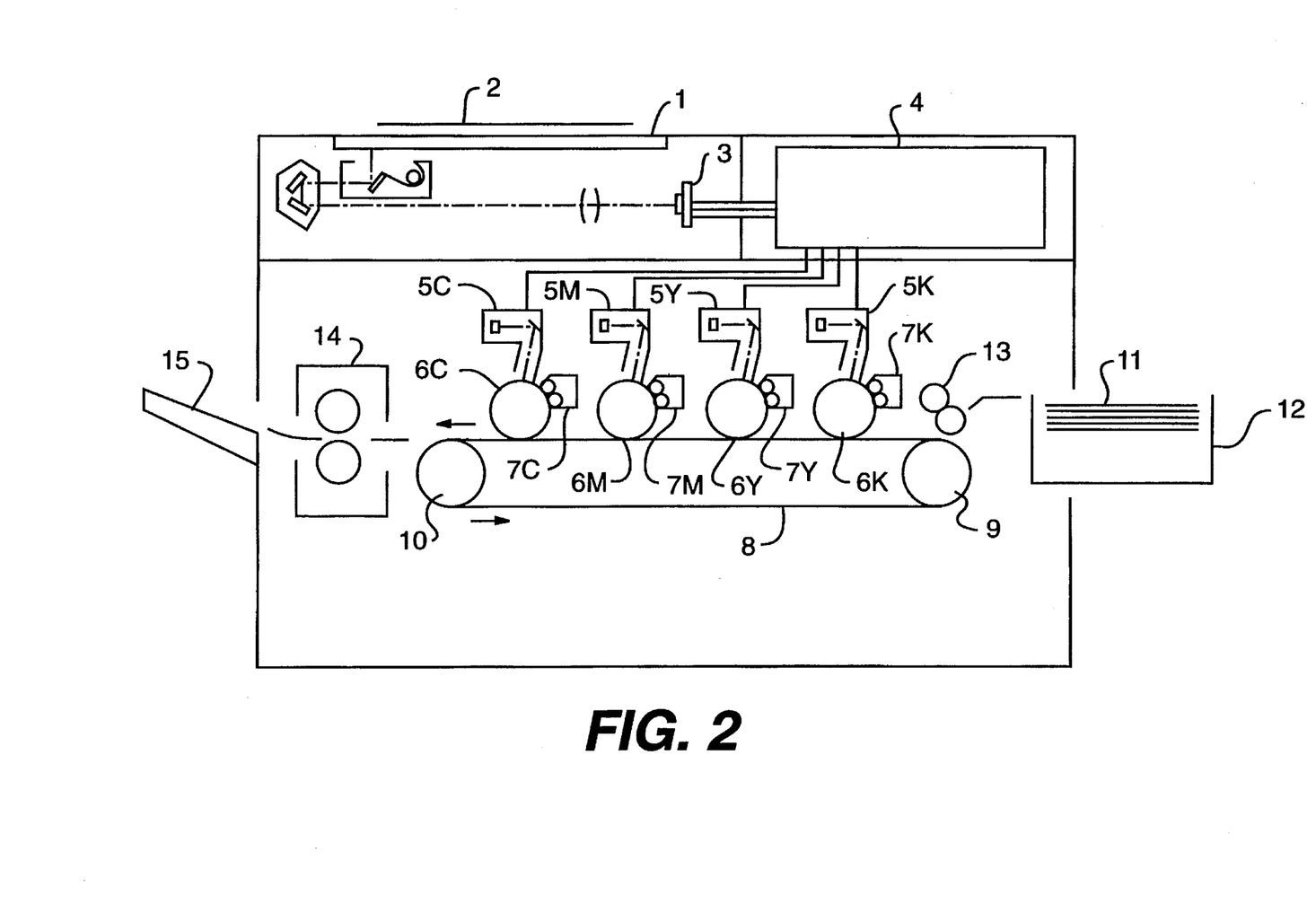
FIG. 2 is a schematic sectional side view of a color image forming device to which the color registration error detecting method according to the present invention is applicable.

FIG. 2 shows a general construction of a digital color copying machine as a preferred embodiment of a color image forming device employing the color registration error detecting method according to the present invention.

Referring to FIG. 2, an original 2 placed on a platen glass 1 is read as an analog RGB image signal by an image scanner provided with a color CCD sensor 3 through a scanning optical system including a light source, scanning mirrors, etc. The analog RGB image signal read by the color CCD sensor 3 is converted into image signals of different colors K, Y, M, and C by an image processing unit 4. The KYMC image signals are temporarily stored in a memory provided in the image processing unit 4.

The KYMC image data are sequentially output from the image processing unit 4 to laser beam scanning devices 5K, 5Y, 5M, and 5C in respective image forming units. Then, electrostatic latent images corresponding to the KYMC image data are formed on photosensitive drums 6K, 6Y, 6M, and 6C by the laser beam scanning devices 5K, 5Y, 5M, and 5C, respectively. The electrostatic latent images formed on the photosensitive drums 6K, 6Y, 6M, and 6C are developed by developers 7K, 7Y, 7M, and 7C to form toner images of black (K), yellow (Y), magenta (M), and cyan (C), respectively.

A recording paper 11 for recording the toner images formed on the photosensitive drums 6K to 6C is supplied from a paper feed cassette 12. The recording paper 11 supplied from the paper feed cassette 12 is fed onto a transfer feed belt 8 by a feed roller 13 rotationally driven at a predetermined timing. The transfer feed belt 8 is an endless belt wrapped under a given tension between a drive roller 9 and a driven roller 10. The drive roller 9 is rotationally driven by a special motor (not shown) superior in constant-speed rotation. The transfer feed belt 8 is circularly driven by the drive roller 9 at a predetermined speed in a direction depicted by the arrow shown.

Paper feed timing and image write timing are controlled so that a leading end of the recording paper 11 fed by the transfer feed belt 8 and a leading end of the image formed on the first photosensitive drum 6K by the corresponding image forming unit come into coincidence with each other at a transfer point defined as the lowest point of the photosensitive drum 6K. The visible image formed on the photosensitive drum 6K is transferred onto the recording paper 11, once it has reached the transfer point, by a transfer corotron (not shown) or the like.

Thereafter, the recording paper 11 reaches a transfer point defined at the lowest point of the second photosensitive drum 6Y. In a manner similar to that described above, the visible image formed on the photosensitive drum 6Y is transferred onto the recording paper 11 once it has reached the transfer point just under the photosensitive drum 6Y.

After the visible images formed on the photosensitive drums 6M and 6C are similarly transferred in sequence onto the recording paper 11, the recording paper 11 is further fed to reach the driven roller 10. At this time, the recording paper 11 is separated from the transfer feed belt 8 by a separation corotron, a stripper, etc. (not shown) for separating the recording paper 11 from the transfer feed belt 8. Then, the recording paper 11 on which the toner images of the four colors is fixed by a fixing device 14, and is then ejected onto an eject tray 15. Thus, the copying process is thus completed with the color image copied onto the recording paper 11.

Figure 3:
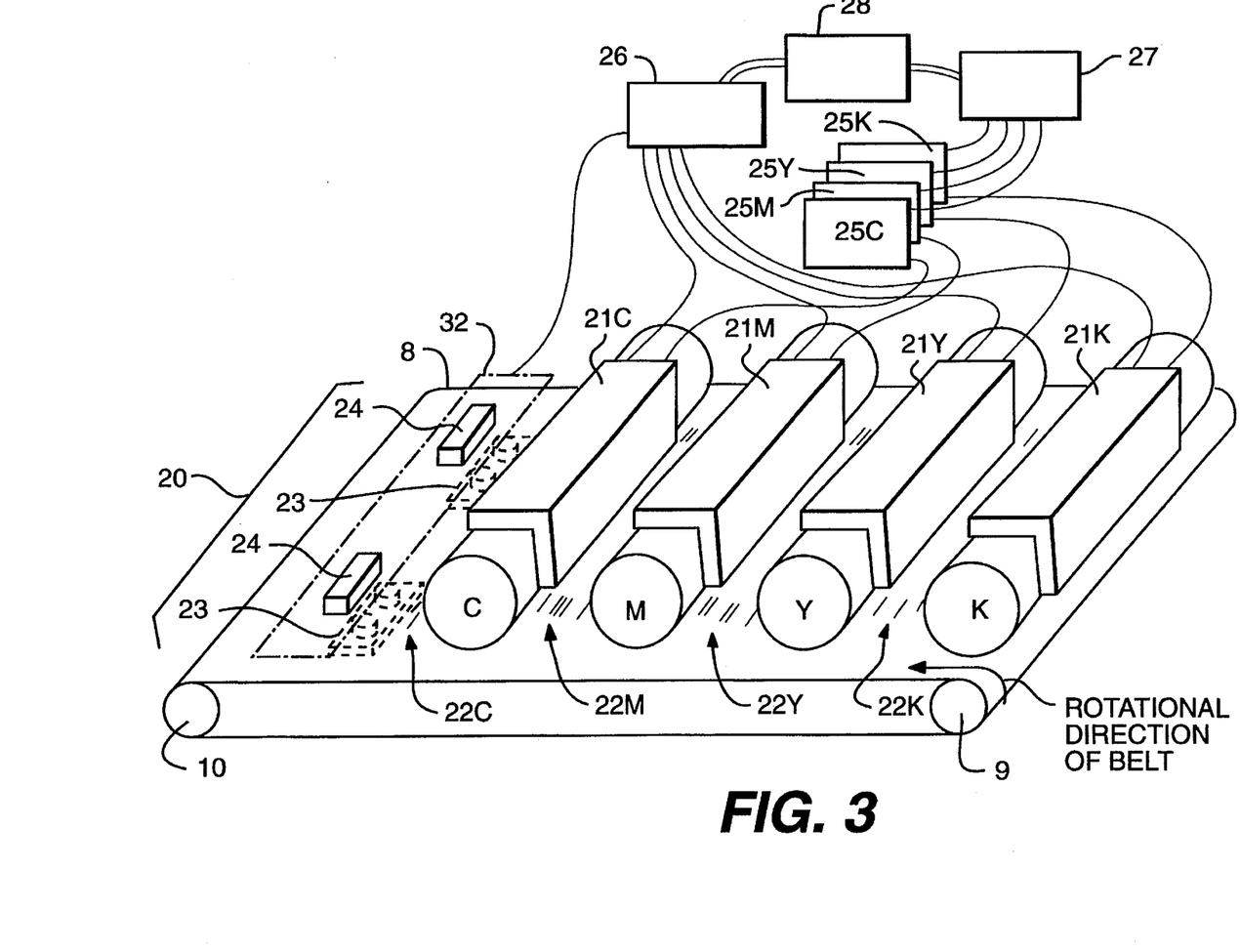
FIG. 3 is a perspective view of an essential part of the color image forming device shown in FIG. 2.

FIG. 3 schematically shows a digital color copying machine of a multiple transfer type employing the color registration error detecting method of the present invention.

With reference to FIG. 3, reference numeral 20 denotes pattern detecting means for detecting image position detection patterns 22 (22K, 22Y, 22M, and 22C) formed on the transfer feed belt 8 by image forming units 21K, 21Y, 21M, and 21C. The pattern detecting means 20 is provided with a pair of light sources 23 and a pair of light receiving elements 24 located at transversely opposite ends of an image area of the transfer feed belt 8.

Each light source 23 includes an LED for generating a background light necessary for detection of the patterns 22 on the transfer feed belt 8. Each light receiving element 24 is arranged so as to be opposed to the mating light source 23 with the transfer feed belt 8 interposed therebetween.

Reference numerals 25K, 25Y, 25M, and 25C denote interface substrates for transmitting image signals to laser beam scanning devices provided in the image forming units 21K, 21Y, 21M, and 21C, respectively. A correction substrate 26 generally controls a registration error correcting system. An image processing substrate 27 has a memory and an image processing unit. A control substrate 28 controls all of the interface substrates 26 and 27 and generally controls the operation of the image forming device.

Figure 4:
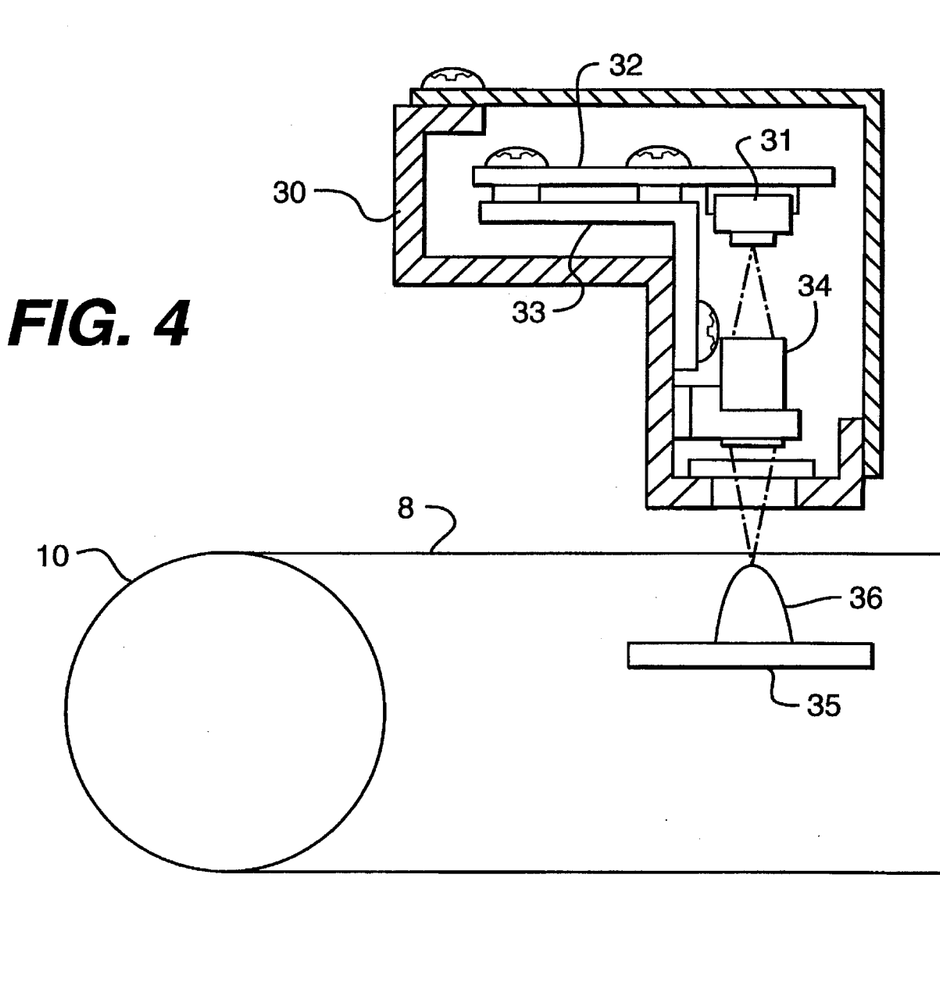
FIG. 4 is a sectional side view showing a preferred embodiment of pattern detecting means to which the color registration error detecting method according to the present invention is applicable.

FIG. 4 is a sectional view of the pattern detecting means.

With reference to FIG. 4, a housing 30 is provided for the pattern detecting means. A linear CCD 31 is provided as the light receiving element 24.

A substrate 32 has the linear CCD 31 and a peripheral circuit for driving the linear CCD 31 mounted thereon. The substrate 32 is mounted through a sectionally L-shaped bracket 33 to the housing 30. Further, a gradual index lens array 34 is provided, and a substrate has an illumination light source 36, corresponding to the light source 23, and a peripheral circuit, for driving the illumination light source 36, mounted thereon.

Figure 5:
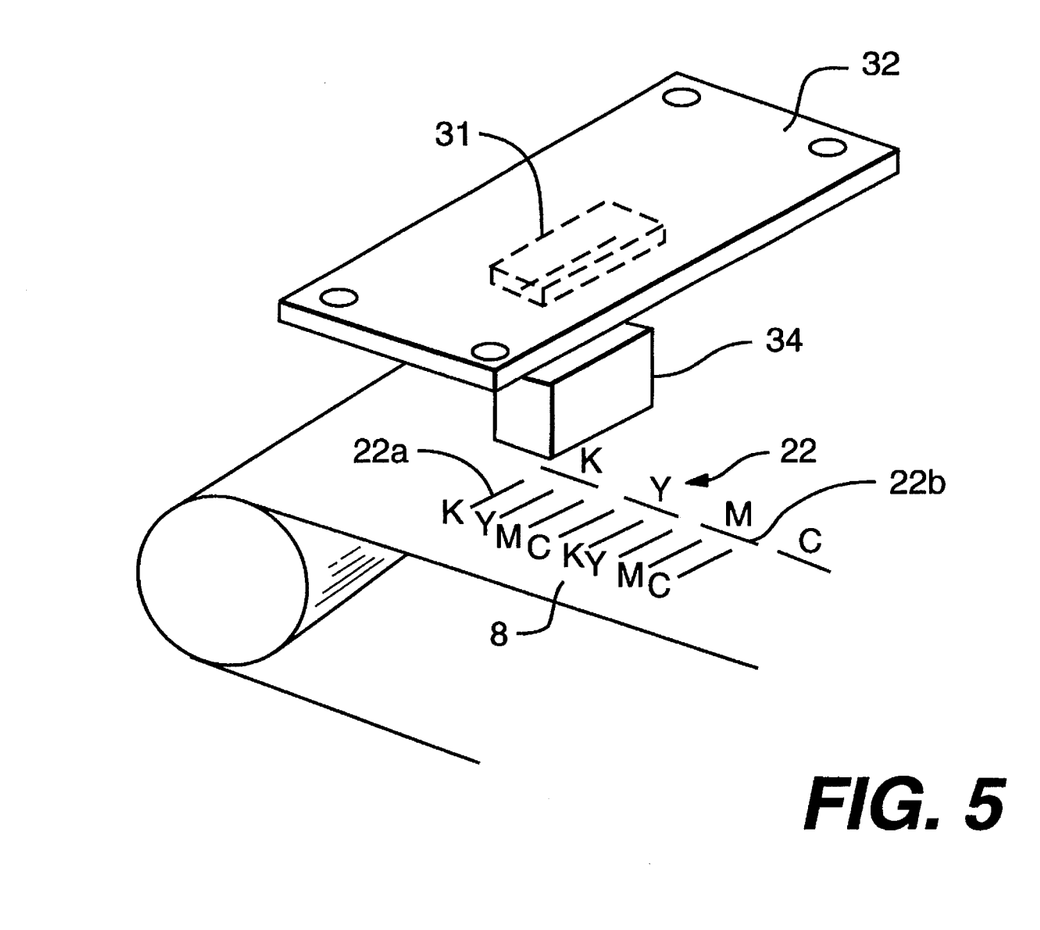
FIG. 5 is a perspective view of the pattern detecting means shown in FIG. 4.

FIG. 5 is a perspective view showing the positional relation between the sensor substrate 32, the gradual index lens array 34, and the image position detection patterns 22 formed on the transfer feed belt 8. Two pairs of the sensor substrates 32 and the gradual index lens arrays 34 are arranged in the housing 30. Further, a pair of the housings 30 are arranged at the transversely opposite ends of the image area of the transfer feed belt 8.

In each housing 30, the linear CCD 31 mounted on the transversely outside sensor substrate 32 is intended to detect the transversely outside patterns 22 in both a horizontal scanning direction and a vertical scanning direction thereof. Although not shown, the linear CCD 31 mounted on the transversely inside sensor substrate 32 is intended to detect the transversely inside patterns 22 in both a horizontal scanning direction and a vertical scanning direction thereof.

The use of the two sensors at each transverse end of the image area of the transfer feed belt 8 enables adjustment of color registration errors in all directions, such as registration errors in the horizontal and vertical scanning directions near the center of a copy, magnification errors in the horizontal and vertical scanning directions, and angular errors with respect to the horizontal scanning direction. However, in adjusting the errors in the horizontal scanning direction only, the single sensor may be used on each side. Thus, as shown in FIG. 3, the pair of the housings 30, each incorporating two sensors 31, are arranged at transversely opposite ends of the image area of the transfer feed belt 8.

While a single LED is used as the illumination light source 36, a plurality of LEDs may be used in the case where a necessary illumination range cannot be ensured by the single LED. For example, when the sensor CCD 31 is used to detect the errors in the horizontal and vertical scanning directions at relatively close positions, a single LED 36 is used, when the sensor CCD 31 is to be used at relatively separate positions, the two LEDs 36 are preferably employed. In this case, the LED 36 of a condenser type is located near the transfer feed belt 8 thereby to obtain an illumination width substantially equal to an external form of the LED. Further, since only several LEDs are energized power consumption can be greatly suppressed.

Figure 6:
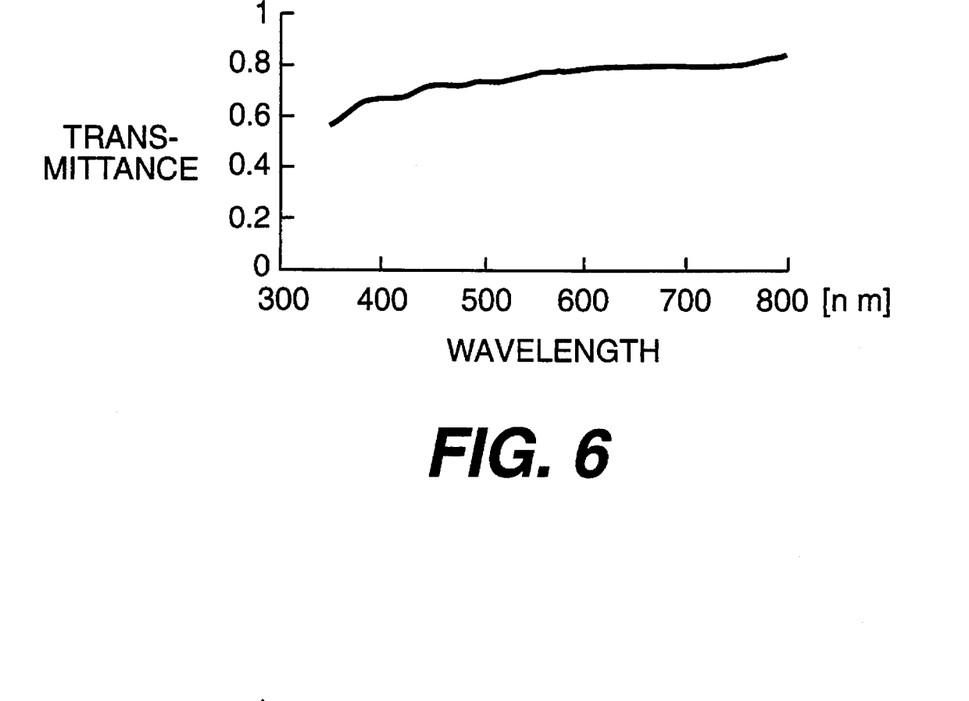
FIG. 6 is a graph showing the relation between a transmittance and a wavelength.

The transfer feed belt 8 is constructed of a transparent material made of PET (polyethylene terephthalate) having a typical transmission characteristic as shown in FIG. 6. As apparent from FIG. 6, the larger the wavelength, the higher the transmittance.

Figure 7:
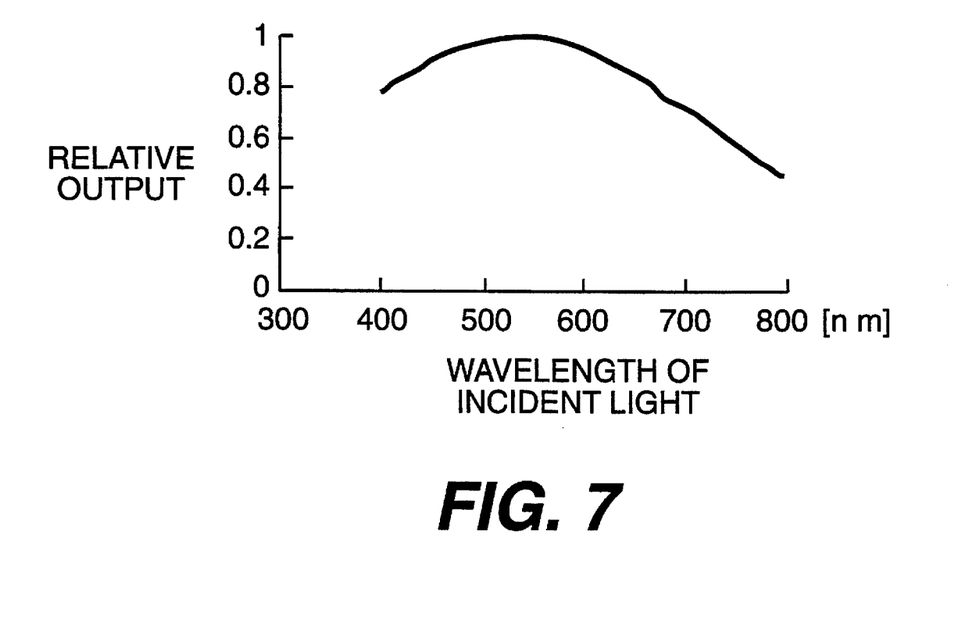
FIG. 7 is a graph showing the relation between a relative output and a wavelength of incident light.

FIG. 7 shows a typical sensitivity characteristic of the CCD 31. As apparent from FIG. 7, the CCD 31 has good sensitivity in a visible light region. Further, a wavelength of light to be emitted from the LED 36 capable of providing high luminance is a red region (600–700 nm). Accordingly, the combination of the CCD 31 and the LED 36 can provide a large sensor output.

When the patterns 22 on the transfer feed belt 8 reach a detecting position, the transmittance at the pattern position becomes nearly zero because the toner forming the patterns 22 is opaque, regardless of its color, thereby making the sensor output very low.

Figure 9:
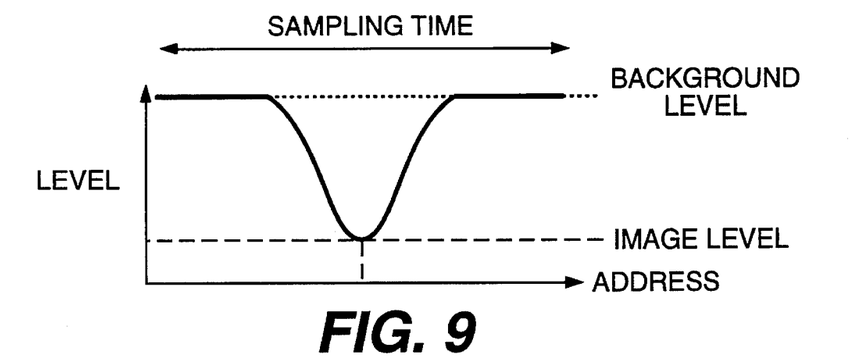
FIGS. 9 and 10 are waveform charts of detection signals.
Figure 10:
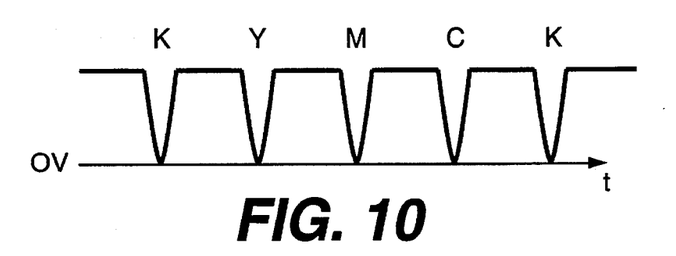

The larger the difference in the sensor output, the stabler the detection. FIGS. 9 and 10 show examples of the sensor output in this preferred embodiment. As apparent from FIGS. 9 and 10, substantially the same output for each color of K, Y, M, and C can be obtained.

Figure 1:
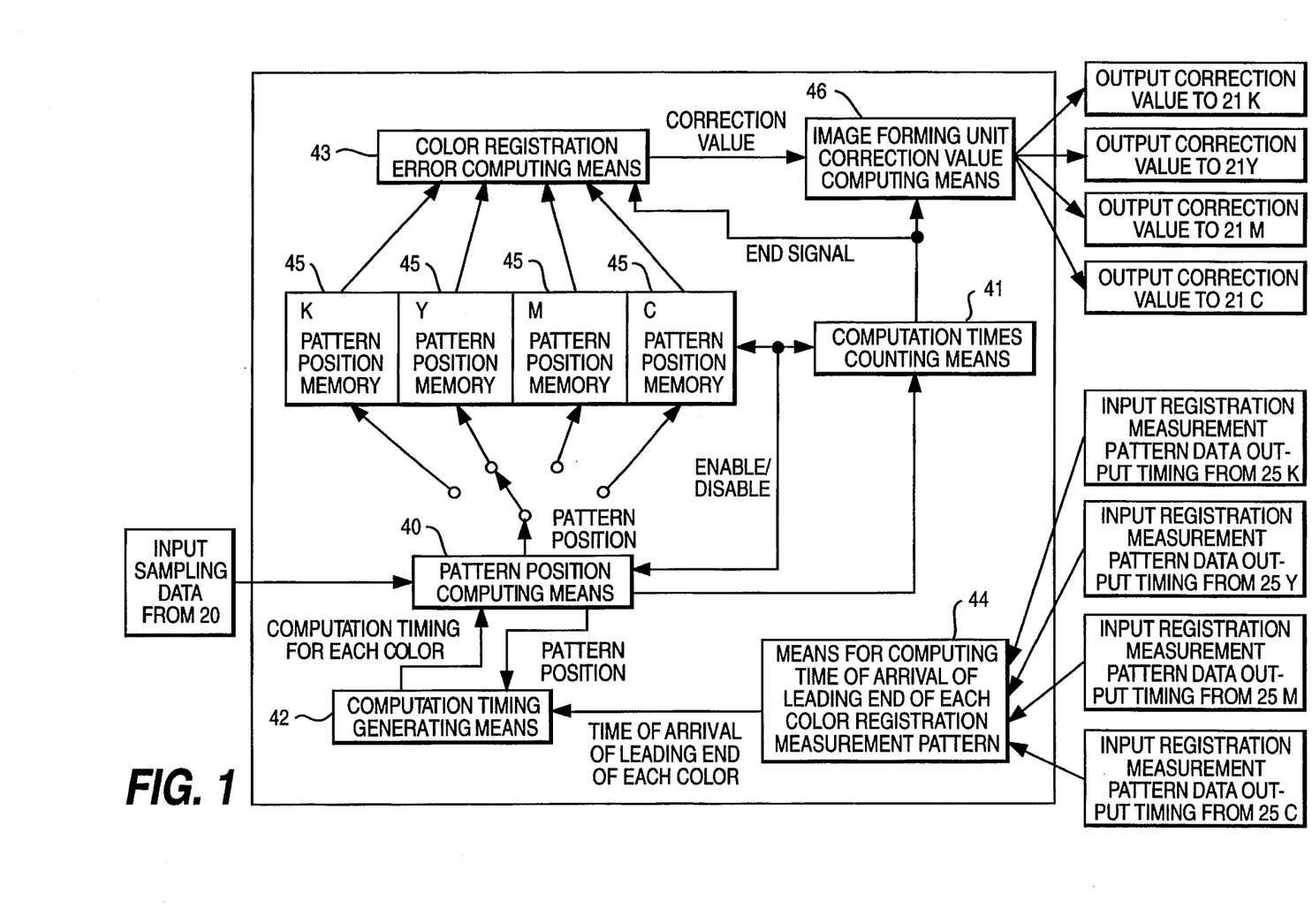
FIG. 1 is a block diagram showing a preferred embodiment of the color registration error detecting method according to the present invention.

FIG. 1 is a block diagram showing a preferred embodiment of a control unit in the color registration error detecting device according to the present invention. The control unit is provided on the correction substrate 26 shown in FIG. 3.

Referring to FIG. 1, the control unit includes pattern position computing means 40; computation times counting means 41; computation timing generating means; color registration error computing means 43; means 44 for computing time of arrival of a leading end of each color registration measurement pattern; pattern position memories 45K, 45Y, 45M, and 45C for the colors K, Y, M, and C, respectively; and image forming unit correction value computing means 46.

In this preferred embodiment, a color registration error is detected by the color registration error detecting device in the following manner. In the digital color copying machine employing the color registration error detecting device, a correction mode based on the color registration error detection is carried out as required during a normal image forming mode (print mode).

In the correction mode, commands are generated from the control substrate 28 to the interface substrates 25K, 25Y, 25M, and 25C. Then, image data of registration measurement patterns for the colors K, Y, M, and C are sequentially generated from registration measurement outputting means provided on the interface substrates 25K to 25C to the image forming units 21K, 21Y, 21M, and 21C, respectively.

At this time, the start timings of generation of the image data from the interface substrates 25K to 25C are the same as the timings in the normal image forming mode (print mode). The registration measurement patterns 22 are then formed according to the image data by the image forming units 21K to 21C, and are sequentially transferred onto the transfer feed belt 8 with the same timing as that in the normal image forming mode (print mode). Thus, the registration measurement patterns 22 are formed on the transfer feed belt 8.

Figure 8:
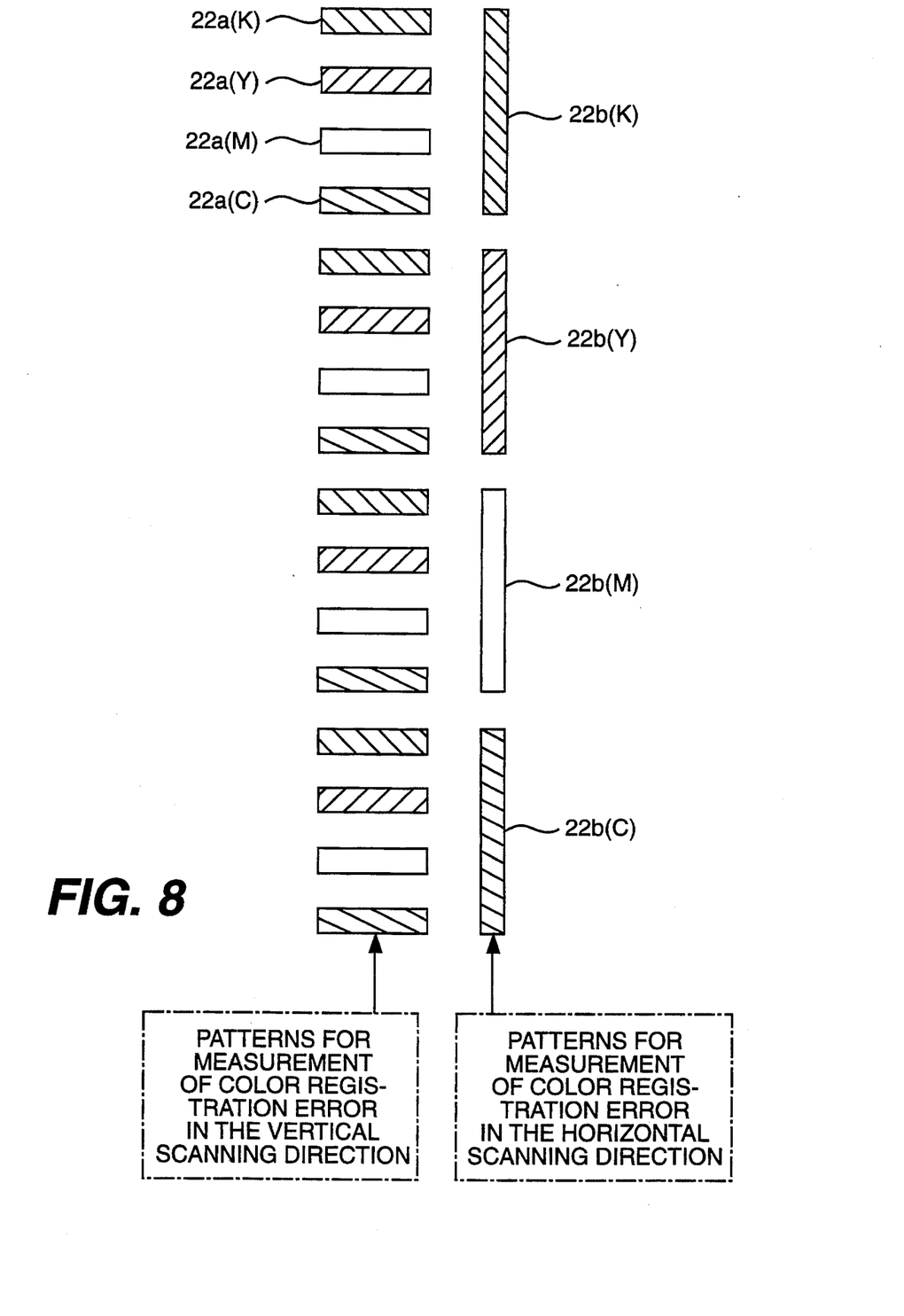
FIG. 8 is a schematic diagram showing patterns for measurement of color registration error.

As shown in FIG. 8, the registration measurement patterns 22 are composed of a plurality of patterns 22a for measurement of color registration error in the horizontal scanning direction and a plurality of patterns 22b for measurement of color registration error in the vertical scanning direction. A couple of patterns 22a and 22b are formed on the transfer feed belt 8 at a given position such that the patterns 22a and 22b may be read by each sensor CCD 31 of the pattern detecting means 20.

The correction substrate 26 monitors the start timings of generation of the registration measurement pattern data from the interface substrates 25K to 25C to the image forming units 21K to 21C, and calculates from each start timing the time of arrival of each registration measurement pattern 22 at a position just under the pattern detecting means 20. The calculation of this time is performed by the computing means 44 shown in FIG. 1.

At this time of arrival, sampling data of the registration measurement patterns 22 sampled by the pattern detecting means 20 is input into the pattern position computing means 40 provided on the correction substrate 26. A position of each registration measurement pattern 22 is calculated by the pattern position computing means 40.

The sampling data input into the pattern position computing means 40 has a profile as shown in FIGS. 9 and 10, for example. The profile includes a change in light quantity due to the pass of each registration measurement pattern 22 just under the pattern detecting means 20.

The pattern position computing means 40 calculates a central position of the change in the light quantity from this profile, and stores the pattern position in one of the pattern position memories 45K to 45C. The correction substrate 26 repeats this operation until the computation times counting means 41 provided on the correction substrate 26 counts a predetermined number of times of computation for each color and then indicates that the reading of the registration measurement patterns 22 be ended.

The interval of computation of the pattern positions is controlled by the computation timing generating means 42 provided on the correction substrate 26. The interval of computation of the pattern positions and the space between the registration measurement patterns are adjusted, and image data are preliminarily output from the interface substrates 25K to 25C to the image forming units 21K to 21C, respectively.

The color registration error computing means 43 provided on the correction substrate 26 then calculates a plurality of color registration errors from the plural pattern positions, and calculates a final color registration error from the plural color registration errors thus calculated with a high accuracy. The final color registration error may be calculated by obtaining a simple mean of the plural color registration errors, by obtaining a median between a maximum and a minimum of the plural color registration errors, or by extracting a value most distributed from the plural color registration errors, for example. Further, after removing abnormal data (data unsuitable for calculation of the final color registration error) in observation of the distribution or transition of the plural color registration errors, the above predetermined computation may be carried out to calculate the final color registration error with high accuracy.

The image forming unit correction value computing means 46 provided on the correction substrate 26 then calculates a correction value for correcting the image forming units 21K to 21C from the final color registration error. The correction value is output to the image forming units 21K to 21C to correct them, thus terminating the color registration error correction mode. In this manner, the color registration error correction mode is carried out as required during the normal image forming mode (print mode) thereby basically to minimize the color registration error.

However, the registration measurement patterns 22 are read by the pattern detecting means 20 together with various vibrational components. As mentioned previously, such vibrational components include:

i) a vibrational component resulting from the registration measurement patterns 22 themselves, that is, a vibrational component due to the fact that the registration measurement patterns 22 are not strictly equally spaced from each other;

ii) a fluctuation in position or speed of the paper feed mechanism, the recording paper, or the intermediate transfer member; and iii) a vibration of the pattern detecting means 20 itself.

Accordingly, if the signal of the registration measurement patterns 22 read by the pattern detecting means 20 includes such vibrational components as mentioned above, the color registration error cannot be accurately detected. As a result, the color registration error cannot be minimized even by performing the color registration error correction mode, and accordingly high-speed and high-quality image formation cannot be effected. Therefore, in order to increase detection accuracy of the color registration error, it is necessary to the influence of such vibrational components.

In the color registration error detecting method according to the present invention, the color registration error can be detected with high accuracy by suppressing the influence of the vibrational components in the following manner.

A method is provided for determining the interval of computation of the pattern positions and for determining the number of times of computation of the pattern positions in the detection of color registration error according to the present invention. In the following description, the interval of computation of the pattern positions is defined as a sampling frequency, and the number of times of computation of the pattern positions is defined as a sampling length. The interval and the number of times are expressed as follows:

Interval=1/(sampling frequency) (1-1)

Number of times=(sampling length)/[(moving speed of transfer feed belt 8)×(Interval)] (1-2)

The present inventors have specifically applied a "sampling theorem", which has been in general use in data sampling, to clarify the relation between the vibration and the color registration error detection accuracy and then obtain the conditions of the sampling frequency and the sampling length so as to minimize the influence of the vibration.

The sampling theorem is one which provides: if a frequency component of a signal f(t) as a function of time t is limited to W Hz or less, the signal f(t) can be perfectly reproduced from a signal value f(i/2W) (i=1, 2, . . . ) measured at a time interval of ½W. In other words, this theorem provides that in order to reproduce an original signal from sampling data, a sampling frequency must be twice or more a maximum frequency in a spectrum distribution of the original signal.

However, in detecting the color registration error, it is sufficient that only the average of the original signal be accurately obtained. That is, it is sufficient that the detection signal of the registration error measurement patterns 22 except the vibrational components be accurately obtained. Therefore, a looser condition may be applied as compared with the above theorem.

Such a condition will be considered in the case where the original signal to be reproduced (the detection signal of the registration error measurement patterns 22) is a sine wave for simplicity.

When an arbitrary sine wave is discretely sampled for a sufficiently long time, the original signal can be reproduced and the average thereof can also be obtained under the condition where the frequency of the sine wave is ½ or less of the sampling frequency as apparent from the sampling theorem. Further, when the frequency of the sine wave is more than ½ to 3/2 or less, the signal to be reproduced is a signal having a frequency equal to the difference between the frequency of the sine wave and the sampling frequency. This signal will be referred to as a virtual sine wave. That is, the original signal cannot be reproduced in this case.

However, when the sampling time is sufficiently long, the average of the virtual sine wave is equal to the average of the original signal, and therefore the average of the virtual sine wave may be obtained. Similarly, when the frequency of the sine wave is more than 3/2 to 5/2 or less, more than 5/2 to 7/2 or less, . . . , the original signal cannot be reproduced, but the average of the original signal can be accurately measured from the virtual sine wave.

Having thus considered the condition, there is an exception in this consideration. That is, this consideration cannot be applied to the case where the frequency of the sine wave is equal to the sampling frequency or an integer multiple thereof. In this case, the same phase of the sine wave is always measured, and accordingly the error becomes equal to an amplitude of the sine wave in the worst case.

In conclusion, when an arbitrary sine wave is discretely sampled to obtain the average of the sine wave, the conditions to nullify the error (the difference between the real average of the sine wave and the average obtained from the sampling data) are as follows:

(1) The sampling length must be infinite.

(2) The frequency of the sine wave must not be equal to the sampling frequency or an integer multiple thereof.

The condition (2) of the above two conditions is realizable, but the condition (1) is unrealizable because the color registration error cannot always be measured in the actual color image forming device.

Thus, the condition for accurately obtaining the average of the sine wave will be considered in the case where the sine wave is sampled with a finite sampling length.

Figure 11:
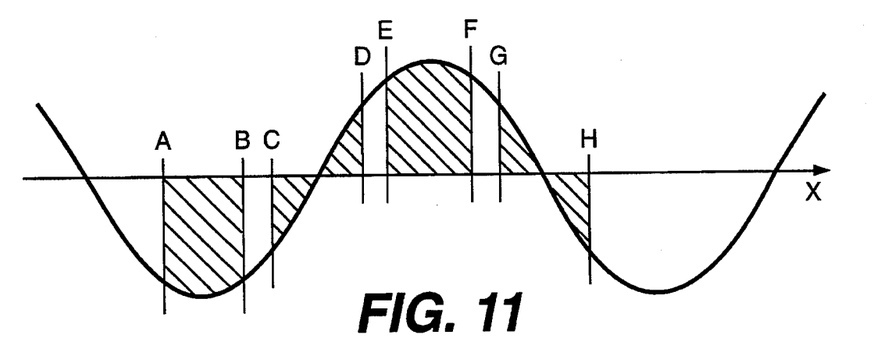
FIGS. 11, 12, 13, 14, 15, and 16 are waveform charts showing a preferred embodiment of the color registration error detecting method according to the present invention.

Even when the sampling lengths in sampling the original signal as the sine wave are the same, the errors are largely different according to the phase of the sampled sine wave. More specifically, in the sine wave as shown in FIG. 11, when an interval AB or EF is sampled, the error becomes maximum, while when an interval CD or GH is sampled, the error becomes zero.

Figure 12:
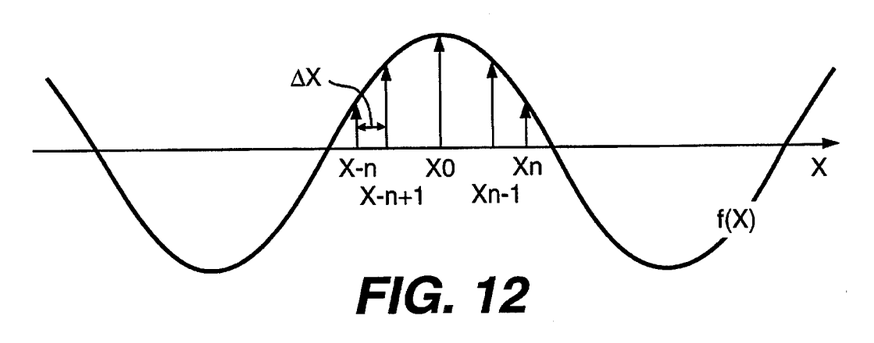

Now, a sampling interval will be considered where the maximum of the sine wave is given at the middle point such as in the interval EF in consideration of the worse case. In this case, when the sine wave is discretely sampled at points of $X_{-n}, X_{-n+1}, \ldots, X_0, X_{n-1}$, and $X_n$ as shown in FIG. 12, the average of the sampling data f(X) is expressed as follows:

$$\text{Average} = \sum_{X=X_{-n}}^{X_n} (f(X)/n) \quad (2)$$

Since the real average is zero, the absolute value of the above average obtained from Expression (2) becomes the error which is defined by the following Expression (3):

$$\text{Error} = |\text{Average}| = \left| \sum_{X=X_{-n}}^{X_n} (f(X)/n) \right| \quad (3)$$

Further, inserting $\Delta X = (X_n - X_{-n})/n$ into Expression (3), the following is given:

$$\text{Error} = \left| \sum_{X=X_{-n}}^{X_n} (f(X) \cdot \Delta X/(X_n - X_{-n})) \right| \quad (4)$$

Expression (4) shows an error obtained by discrete sampling. However, by utilizing the fact that when the sampling data are of a sufficiently great number, the average of the discretely sampled data is equal to the average of continuously sampled data, the error is expressed as follows:

$$\text{Error} \approx \left| \lim_{\Delta X \to 0} \left( \sum_{X=X_{-n}}^{X_n} (f(X) \cdot \Delta X/(X_n - X_{-n})) \right) \right| \quad (5)$$

$$= \left| \sum_{X=X_{-n}}^{X_n} f(X)dX/(X_n - X - n) \right|$$

Figure 13:
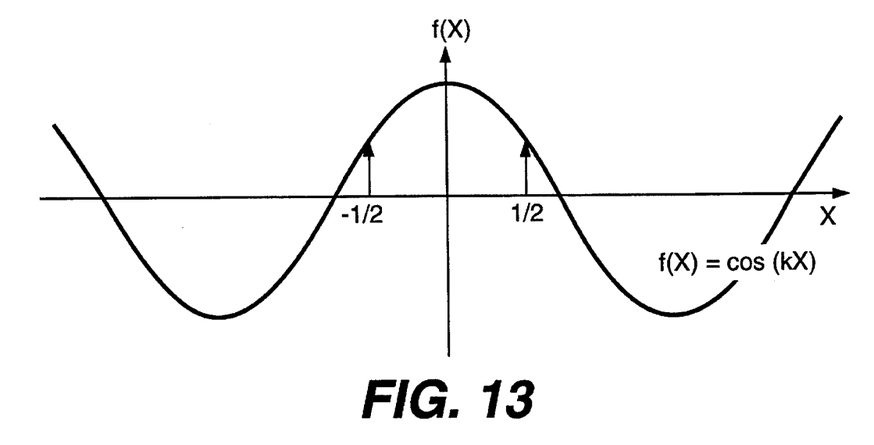

Further, taking an axis of ordinate for f(X), letting L denote the sampling length, and taking a range of −½ to +½ for the sampling interval as shown in FIG. 13, the error is expressed as follows:

$$\text{Error} = \left| \int_{-1/2}^{1/2} \cos(kX)dX/1 \right| = |\sin(k1/2)/(k1/2)| \quad (6)$$

Then, inserting $\lambda = 2\pi/k$ ($\lambda$: wavelength of the sine wave) into Expression (6), the following applies:

$$\text{Error} = |\sin(\pi l/\lambda)/(\pi l/\lambda)| \quad (7)$$

Figure 14:
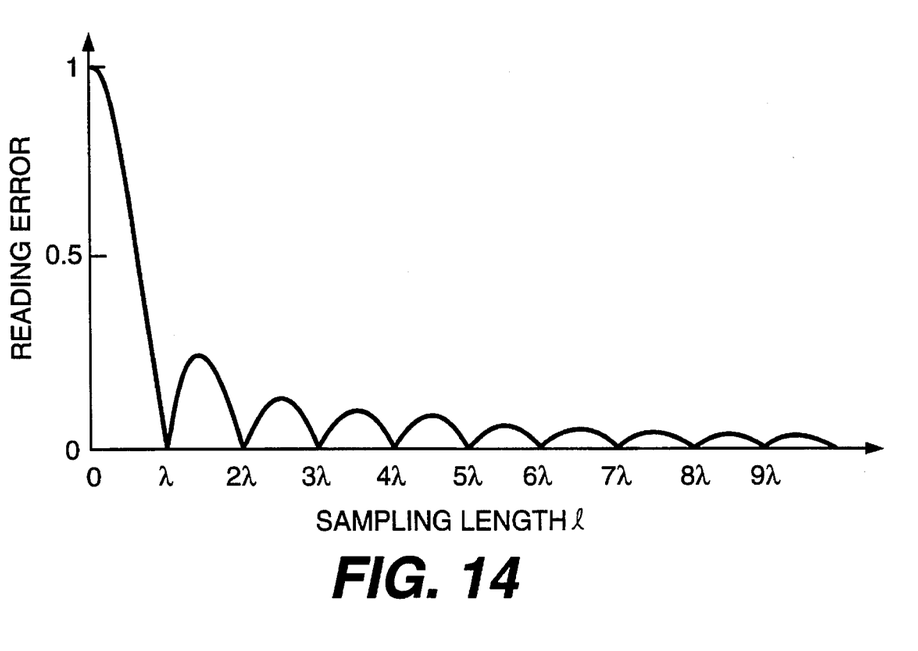

Expression (7) is graphed in FIG. 14, and it is understood that the condition for nullifying the error with a finite sampling length is as follows:
 (1) L=λm (m: positive integer)
or,
 (2) λ→0 (the smaller the value λ, the smaller the error, and it is converged to zero)

Further, when the frequency of the sine wave is ½ or more of the sampling frequency, the above Expressions can be applied to the virtual sine wave.

The above condition for nullifying the error will now be applied to color registration error detection. Actual vibration to be read by the CCD sensor is not a sine wave. However, by utilizing the fact that an arbitrary wave can be expressed by overlapping a plurality of sine waves, the above condition may be applied to each vibrational component.

In actually, however, the sampling frequency and the sampling length cannot be changed for every frequency of the vibrational components. Thus no condition exists for nullifying the errors for all the vibrational components. Accordingly, the conditions for minimizing the error may be obtained from the above condition for nullifying the error, which conditions are as follows:

(1) The sampling length is to be approximated to a wavelength of the sine wave or the virtual sine wave, or to an integer multiple of this wavelength;
 (2) The sampling length is to be increased as greatly as possible; and
 (3) The wavelength of the virtual sine wave is to be decreased as greatly as possible, that is, the frequency of the sine wave is to be separated as far as possible from the sampling frequency or an integer multiple thereof.

A best sampling frequency and a best sampling length are obtained by simulation as follows. Expression (7) cannot be used because of discrete sampling. Therefore, Expression (3) is used and f(X)=cos(kX) is inserted into Expression (3) to carry out the sampling at the points of $X_{-n}$, $X_{-n+1}$, . . . , $X_0$, . . . , $X_{n-1}$, and $X_n$. In this case, the procedure of simulation is as follows:

(1) Obtain a spectrum distribution (frequency and amplitude) of the vibrational component to be read with the color registration error by the pattern detecting means.
 (2) Obtain the ranges of a sampling frequency $f_s$ and a sampling length L to be simulated. The ranges depend on various conditions such as a processing capacity of an electrical circuit, a required time thereby, and convenience in creation of S/W.
 (3) Vary the sampling frequency $f_s$ to carry out the simulation, wherein an influential candidate of the sampling length L is selected in the range decided in the step (2).
 (4) Obtain the sampling points $X_{-n}$, $X_{-n+1}$, . . . , $X_0$, . . . , $Xn_{n-1}$, and $X_n$ from the combination of the sampling frequency $f_s$ and the sampling length L decided in the steps (2) and (3). In general, the sampling points are expressed as follows:

$$-3V_p/f_s, -2V_p/f_s, -V_p/f_s, 0, V_p/f_s, 2V_p/f_s, 3V_p/f_s \quad (8)$$

where $V_p$ represents a moving speed of the transfer feed belt 8. Expression (8) shows that when the sampling number ($=1/(V_p/f_s)$) is less than 2, the sampling is carried out at only one point of $X_0=0$.

Figure 15:
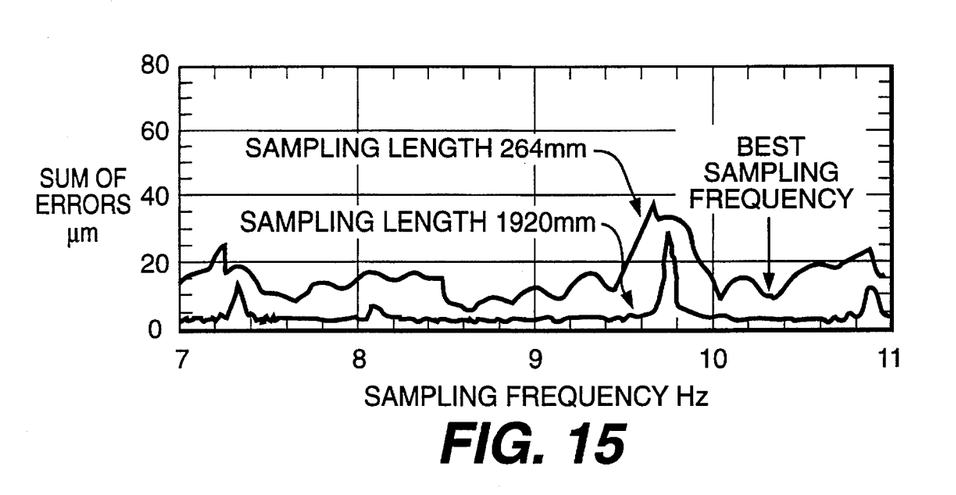
Figure 16:
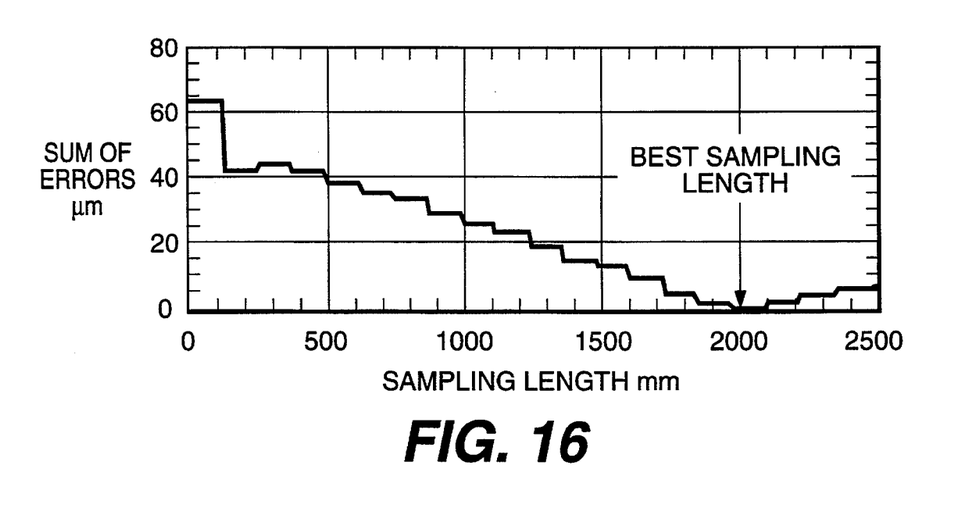

(5) Calculate the errors at the sampling points obtained in the step (4) for every fluctuation component by using the expression obtained by inserting f(X)=cos(kX) into Expression (1), and then obtaining the sum of the errors for all the fluctuation components.
 (6) Repeat the operations of the steps (4) and (5) in the range of the sampling frequency decided in the step (2) to make a graph of "sampling frequency vs sum of errors" as illustrated in FIG. 15.
 (7) Determine a best sampling frequency from this graph of "sampling frequency vs sum of errors" in consideration of (a) the sum of errors is to be small, (b) the sum of errors is not to be rapidly increased even when the frequency fluctuates more or less, and (c) the frequency is to be as high as possible.
 (8) Fix the sampling frequency to the value obtained in the step (7), and then repeat the operations of the steps (4) and (5) with the sampling length varied to make a graph of "sampling length vs sum of errors" as shown in FIG. 16.
 (9) Determine a best sampling length from the graph of "sampling length vs sum of errors" in consideration of (a) the sum of errors is to be small, (b) the sum of errors is not to be rapidly increased even when the length fluctuates more or less, and (c) the length is to be as small as possible from the viewpoint of reduction in a processing time.

As understood from FIGS. 15 and 16, if the sampling frequency is decided without using the present invention, the maximum error becomes about 40 μm, and if the sampling length is decided without using the present invention, the maximum error becomes about 60 μm. On the other hand, when the sampling frequency only is decided by using the present invention, the error becomes about 10 μm, and when both the sampling frequency and the sampling length are decided by using the present invention, the error becomes 1 to 2 μm.

Thus, in the color registration error detecting method for repeatedly forming a plurality of registration error detection patterns 22 of different colors on an image carrier, detecting the plurality of registration error detection patterns 22, and detecting a color registration error from detection signals of the patterns 22, a sampling length and a sampling frequency for detection of the registration error detection patterns are set so as to satisfy the following conditions:

(1) The sampling length is to be approximated to a wavelength of a vibrational component owned by each detection signal or to a integer multiple of the wavelength.
 (2) The sampling length is to be set as large as possible.
 (3) The sampling frequency and an integer multiple thereof are to be separated as far as possible from a frequency of the vibrational component owned by each detection signal.

Accordingly, by sampling the original color registration error only from the color image registration error and the various vibrational components to be read by the pattern detecting means 22, the detection accuracy of the color registration error can be improved. Accordingly, the color registration error detecting method can realize both high quality and high speed in a color image forming device.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A color registration error detecting method for repeatedly forming a plurality of registration error detection patterns of different colors on an image carrier, the steps of said method comprising:

detecting said registration error detection patterns; on the basis of a sampling process having a sampling length and a sampling frequency;

detecting a color registration error from detection signals of said patterns;

setting said sampling length equal to a largest possible value approximately corresponding to a wavelength of a vibrational component to be read with a registration error component by registration error detecting means or to an integer multiple of said wavelength; and separating said sampling frequency and an integer multiple thereof as far as possible from a frequency of said vibrational component.

2. The color registration error detecting method as defined in claim 1, wherein an interval of repeated detection in said color registration error detecting step is determined from the following expression in relation to said vibrational component ($f_i(t)$ where t=time; i=1 to m) to be read with said registration error component by said registration error detecting means:

$$\text{Error} = |\Sigma\Sigma f_i(\text{int} \times j)|/n$$

where $\Sigma$ of the first occurrence takes i=1 to m; $\Sigma$ of the second occurrence takes j=1 to n; m represents the kind of said vibrational component; n represents the number of times of said repeated detection of said color registration error; and int represents said interval of said repeated detection of said color registration error.

3. The color registration error detecting method as defined in claim 1, wherein the number of times of repeated detection in said color registration error detecting step is determined from the following expression in relation to said vibrational component ($f_i(t)$ where t=time; i=1 to m) to be read with said registration error component by said registration error detecting means:

$$\text{Error} = [\Sigma\Sigma f_i(\text{int} \times j)]/n$$
$$= [\Sigma\int f_i(t)dt]/L$$

where $\Sigma$ of the first occurrence takes i=1 to m; $\Sigma$ of the second occurrence takes i=1 to n; $\int$ takes 0 to 1; m represents the kind of said vibrational component; n represents the number of times of said repeated detection of said color registration error; int represents an interval of said repeated detection of said color registration error; and L=n×int.

4. The color registration error detecting method as defined in claim 1, wherein an interval of repreated detection in said color registration error detecting steps and the number of times of said repeated detection in said color registration error step are determined from the following expression in relation to said vibrational component ($f_i(t)$ where t=time; i=1 to m) to be read with said registration error component by said registration error detecting means:

$$\text{Error} = [\Sigma\Sigma f_i(\text{int} \times j)]/n$$
$$= [\Sigma\int f_i(t)dt]/L$$

where $\Sigma$ of the first occurrence takes i=1 to m; $\Sigma$ of the second occurrence takes j=1 to n; $\int$ takes 0 to 1; m represents the kind of said vibrational component; n represents the number of times of said repeated detection of said color registration error; int represents said interval of said repeated detection of said color registration error; and L=n×int.

5. The color registration error detecting method as defined in claim 2, wherein when a frequency Fs of said registration error component is less than a value twice a frequency Fac of said vibrational component to be read with said registration error component in said registration error detecting step, a moire signal (frequency=|Fac−Fs×k| where if Fs/2<Fac≦3Fs/2, k=1; if 3Fs/2<Fac≦5Fs/2, k=2; and so forth) to be generated by both said registration error component and said vibrational component is used as $f_i(t)$ (t=time; i=1 to m) to obtain said color registration error.

6. The color registration error detecting method as defined in claim 3, wherein when a frequency Fs of said registration error component is less than a value twice a frequency Fac of said vibrational component to be read with said registration error component in said registration error detecting step, a moire signal (frequency=|Fac−Fs×k| where if Fs/2<Fac≦3Fs/2, K=1; if 3Fs/2<Fac≦5Fs/2, k=2; and so forth) to be generated by both said registration error component and said vibrational component is used as $f_i(t)$ (t=time; i=1 to m) to obtain said color registration error.

7. The color registration error detecting method as defined in claim 4, wherein when a frequency Fs of said registration error component is less than a value twice a frequency Fac of said vibrational component to be read with said registration error component in said registration error detecting step, a moire signal (frequency=|Fac−Fs×k| where if Fs/2<Fac≦3Fs/2, k=1; if 3Fs/2<Fac≦5Fs/2, k=2; and so forth) to be generated by both said registration error component and said vibrational component is used as $f_i(t)$ (t=time; i=1 to m) to obtain said color registration error.

\* \* \* \* \*